Jan. 28, 1969    R. C. SNEPVANGERS    3,423,850
AUTOMATED TEACHING APPARATUS
Filed Oct. 17, 1966

INVENTOR.
RENÉ C. SNEPVANGERS

ATTORNEY

INVENTOR.
RENE C. SNEPVANGERS

ATTORNEY

United States Patent Office 3,423,850
Patented Jan. 28, 1969

3,423,850
AUTOMATED TEACHING APPARATUS
Rene C. Snepvangers, Croton-on-Hudson, N.Y.; Hannah K. Snepvangers, administratrix of said Rene Snepvangers, deceased
Filed Oct. 17, 1966, Ser. No. 587,302
U.S. Cl. 35—35
Int. Cl. G09b 5/04
6 Claims

ABSTRACT OF THE DISCLOSURE

A tape recorder system is provided in which a recording tape having a plurality of tracks, on one of which is permanently recorded the music or voice rendition of the teacher, the other track being erasible by an erasing head provided as part of the system and capable of carrying the recorded voice of the pupil. The change over from play back mode to drill sequence is automatically operated by a switch actuated by a pressure sensitive conductor on the non-magnetically coated side of the tape. A synchronized motor driven timing mechanism provided with cams on a solenoid actuated rotating shaft controls the timing cycle of the drill.

---

This invention relates to a method and apparatus for teaching various subjects, such as foreign languages or music, and more particularly to sound recording and reproducing devices such as tape recorders.

It is an object of this invention to provide a tape recorder device capable of receiving and playing back a tape in four steps; namely, a first step in which the pupil listens to a permanently recorded instruction of the teacher and then a drill exercise which begins with the playback of the teacher's rendition of a particular phrase, a second step in which the pupil repeats the particular phrase into a microphone for recording on the tape, a third step where the same phrase, repeated by the teacher, permanently recorded on the tape, is being played back again for the student to listen to, and fourth, a playback of the student's own voice which he had recorded in the second step.

A further object of the invention is to provide an instruction device which permits the student to hear twice the recorded rendition of the teacher at a spaced interval during which the student repeats the phrase, and then to hear a playback of his own rendition for comparison purposes immediately following the second or repeated sound of the teacher's voice or musical rendition.

To these ends and in accordance with one feature of the present invention, a tape recorder device is provided in which a recording tape having a plurality of tracks, on one of which is permanently recorded the voice or musical rendition of the teacher, the other track being erasable by an erasing head provided as part of the apparatus and capable of carrying the recorded voice of the pupil. The changeover from regular playback mode to drill sequence mode is automatically operated by a gate circuit switch actuated by a pressure-sensitive conductive foil attached to the non-magnetically coated side of the tape. No switching by the student is necessary until the end of the lesson. A synchronized motor-driven timing mechanism provided with cams on a slowly rotating shaft, controls the timing, wherein one cycle of the complete drill sequence is divided into four equal parts. Micro-switches, operated by the cams, actuate the mechanism for the successive phases of the cycle.

The foregoing and other objects, advantages and features of this invention will be better understood from the following description of typical embodiments of the invention illustrated by way of example on the accompanying drawing, in which:

FIG. 5A is a view of the same and a further section of the tape of FIGS. 3–5 in the direction of travel;

FIG. 8 shows diagrammatically another embodiment of the invention utilizing a different manner of forming the open loop of the tape.

The same reference numerals are used to designate the same or functionally similar parts throughout the several views.

Figure 1:
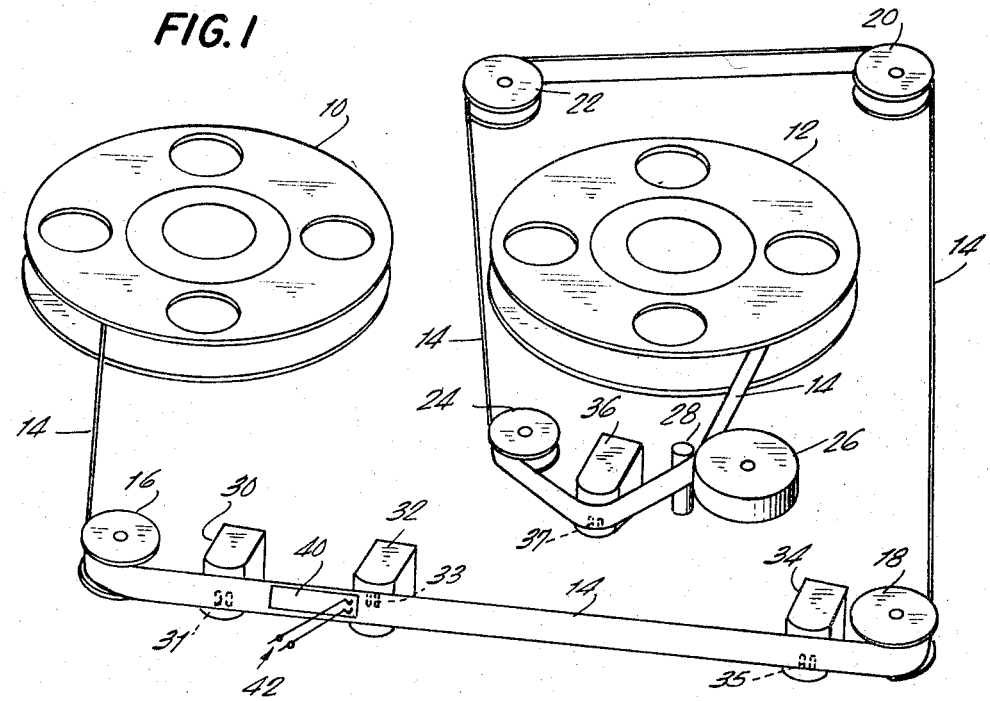
FIG. 1 is a perspective view showing the general arrangement of the various parts and elements of the invention.

FIG. 1 shows the general layout of the tape recorder and playback device according to the invention, in which 10 represents the supply reel and 12 represents the take-up reel for the magnetically coated tape band or recording medium 14. The tape band 14 is guided around a plurality of rollers, more clearly shown in FIG. 2, and designated by the numerals 16, 18, 20, 22 and 24 and pulled along by means of a pressure roller 26 and cooperating capstan post 28 on respectively opposite sides of tape 14. Suitably located at critically selected exact locations along the tape, to be more fully described below, are a demagnetizer or erasing head 30 with pole pieces 31 on the student's track, a first transducer or playback head 32 with its pole pieces 33 arranged to play back only the teacher's rendition, which is herein designated as the upper half track or channel, a recording head 34 with pole pieces 35 arranged to record only on the student's half track, which herein is shown as the lower half track or channel on tape 14, and a second transducer or playback head 36 located further along on the tape and having its pole pieces 37 arranged also on the lower track to play back the student's rendition, in sequence. At appropriate locations along the tape band 14, fastened by adhesive to the glossy or non-magnetically coated side of the tape 14 are short lengths of electrically conductive foil 40 which serve to close gate contact 42 for actuating a gate circuit, to be more fully described below in connection with FIG. 6.

Figure 2:
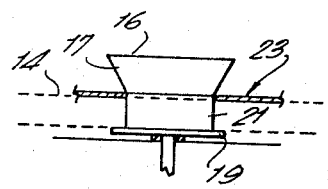
FIG. 2 is an elevation view of a portion of the device of FIG. 1, illustrating the guide rollers.

The tape guide rollers 16, 18, 20, 22, 24 shown in FIG. 2 have an upper portion 17 in the shape of an inverted truncated cone and a lower flange 19, both attached to a central cylindrical portion 21. The conical part 17 is located above the top plate 23 of the instrument, and during its travel the tape 14 rides above the lower flange 19. The truncated cone portion 17 and the flange 19 of the roller facilitate the initial readying and threading of the tape around the rollers and assures that the tape will be maintained at a desired level in the channel and kept in correct position relative to the heads 32, 34 and 36. The tape path is located between the top plate 23 of the instrument and the top level of the flange 19, as shown in FIG. 2.

Any desired tape speed may be used in this instrument. However, I have found that a duration of four seconds time is the optimum for each of the various steps according to the drill sequences performed by the device of the present invention; namely, the teacher's rendition of a particular phrase to which the student listens for four sends, the student's repetition for four seconds, the student's listening for four seconds to the repeated teacher's rendition, and then listening for four seconds to the student's own rendition. Accordingly, the length of time which it takes for the recorded spaces on the tape to travel between the playback head 32, the recording head 34 and the playback head 36 must be adjusted accordingly. In the particular example discussed herein a tape speed of 1⅞ inches per second was used. The length of tape between the heads 34 and 36 must be twice the length of the tape between the heads 32 and 34 (see FIG. 5) for reasons which will become apparent as the description proceeds.

Figure 3:
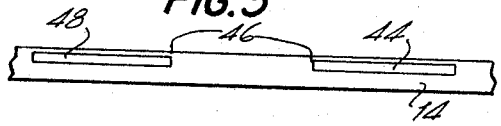
FIG. 3 illustrates a portion of the tape on the upper track or channel of which is twice recorded at spaced intervals the teacher's voice or musical rendition.

FIG. 3 represents schematically a linear portion of the tape 14 after it has been imprinted magnetically by the teacher's voice or musical rendition of a particular phrase for a drill exercise. The top half track of the tape is represented at 44 and illustrates the magnetic impression of the first spoken phrase or played musical phrase. The length of the magnetized part 44 of the tape 14, corresponding to a time duration of four seconds at a tape speed of 1.875 inches per second, will extend for 7½ inches along the tape. Following the tape length portion 44 in the direction of travel of the tape 14 is a blank space 46 on the upper recording channel extending for the same length, namely 7½ inches, as the magnetized length 44. This is then followed on the upper channel by a further magnetized length 48 of the same duration, namely 7½ inches, containing a magnetized impression of a repeat of the same spoken or musical phrase by the same teacher. In order not to have changes of intonation or pronunciation it is preferable to have both lengths 44 and 48 recorded simultaneously on the upper track when the tape is originally recorded by the teacher on another tape recorder.

Figure 4:
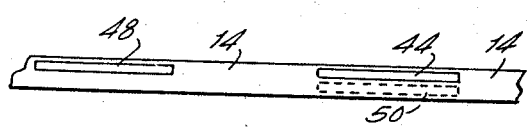
FIG. 4 shows graphically the same length of tape as shown in FIG. 3 to which has been added the student's recording of his own rendition on the lower track or channel of the tape.

FIG. 4 illustrates the same portion of the tape 14 as in FIG. 3, with a schematic representation added at 50 to designate the magnetic impression of the student's voice or rendition, recorded through recording head 34 and pole pieces 35 onto the lower half track of the tape 14. The length of tape 14 allocated to the magnetic impression 50 made by the student's rendition likewise lasts four seconds and therefore extends 7½ inches at a tape speed of 1.875 inches per second. The pupil records his rendition on tape segment 50 on the lower half track immediately after he hears the teacher's first rendition on tape segment 44 as it passes the playback head 32 and its pole pieces 33 on the upper half track. This feature is made possible by the exact and precise location of the recording head 34 along the tape band, in relation to the playback head 32 and the subsequent playback head 36.

Figure 5:
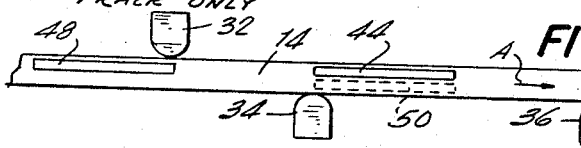
FIG. 5 shows graphically the position of the same length of tape of FIGS. 3 and 4 in relation to the magnetic playback heads of the device.

FIG. 5 represents the location of the same portion of tape 14 of FIGS. 3 and 4, schematically represented with relation to the playback head 32, the recording head 34 and the playback head 36 at the exact instant that the student has finished speaking or playing his version at 50 of the drill phrase first rendered by the teacher at 44. Immediately after the student, speaking or playing through a microphone 63 (FIG. 6) connected through the amplifier 62 to the recording head 34, has recorded his rendition at 50 (FIG. 5) onto the lower track of the tape, the teacher's repeat phrase 48 is going to be played by the upper track play-back head 32 as the tape 14 passes it in the direction of the arrow A. Thus, the segment 44 was heard for four seconds as it passed the play-back head 32 and four seconds was allocated for the tape length of segment 50 as it passed the lower track recording for the student's voice. It will take four seconds for the length of tape 48 to pass the playback head 32. It will be noted that the magnetic recording of the student's voice at 50 on the lower track is parallel to and of exactly the same duration as the tape segment 44 of the teacher's rendition on the upper track. Thus, when the student has finished his rendition the tape is in the position shown in FIG. 5, and the student will then hear the repeated teacher's rendition recorded at 48 as it passes the upper track playback head 32 for four seconds. At that time, the student's rendition at 50 will be located so that its forward end is opposite the playback head 36, and the student will then hear a playback of his own rendition at 50 as the latter passes the lower track playback head 36. This completes the cycle, and as the tape progresses in the direction of arrow A of FIG. 5, a second phrase recorded at 52 (FIG. 5A) by the teacher and recorded on the upper half track in repeated sequence, the same as the high phrase at 44 and 48, is spaced along the track for playback by head 32 as soon as the end of the student's voice at 50 passes the lower track playback head 36. This condition is illustrated in FIG. 5A.

Thus it may be seen that, by locating the heads 32, 34 and 36 at exactly spaced predetermined distances along the tape 14, the following cycle is obtained during the drill-sequence mode of operation:

(1) Playback of the teacher's drill phrase for four seconds.

(2) Recording of the student's rendition for four seconds.

(3) A playback repetition of the teacher's drill exercise for four seconds.

(4) A playback of the student's rendition for four seconds.

This cycle is then repeated with the next phrase for a total of 16 seconds and so forth, over and over again with further and different drill exercises.

The circuit diagram of FIG. 6 will now be described. Alternating current from the source 58 energizes the amplifier 62. The general or main switch 60 turns the current on and off to the amplifier. A tape-breakage switch 64 placed in the line 65 feeds current to all other elements. The first playback head 32 for the teacher's voice is connected in parallel with the student's playback head 36. A microphone 63 is actuated by means of the switch 66, which is a two-way switch connecting the amplifier either to the contact 67 of the two playback heads 32, 36 or to the contact 69 of the microphone 63. Another two-way switch 68, on the same shaft 70 as the switch 66, connects the output of the amplifier 62 either to the contact 71 of the loud speaker 72 or to the contact 73 of the recording head 34.

The entire switching function is handled automatically by means of a solenoid device 74 provided with a soft iron plug member 76, biased by means of a spring 75 and attached to a lever arm 78 on shaft 70. The solenoid 74 is energized with direct current supplied through a rectifier 79 and filtering capacitor 80. A neon tube 82 provided with a dropping resistor 84 and a bleeding resistor 85 completes the rectifier circuit. The neon tube or indicator lamp 82 will light up during the recording portion of the cycle, and the resistors 84, 85 serve to provide a short fade-out of the neon tube.

The contact foil 40 attached to the non-magnetic side of the tape 14 at a particular location along the tape as illustrated in FIG. 1 serves to short circuit the contacts 42 and thereby closes the gate circuit controlled thereby. This gate circuit comprises a low voltage A.C. current source 86 which feeds a gate-circuit relay 88 when the gate contacts 42 are short circuited. The swinging contact arm 90 forming part of the relay 88 is normally closed in position contacting the contact 92, but when the gate circuit is closed the relay contact arm 90 switches over to contact 94 to close the circuit from contact 94 to microswitch 120–122 of cam 116.

The device is provided with two motors, namely motor 100 which drives the tape-pulling capstan 28 and motor 110, which is a synchronized cycling motor provided with a cam shaft 112 on which are fixedly mounted a plurality of cams 114, 116 and 118. As will be described in more detail below, these respective cams act upon microswitch elements of the automated cycling system.

Figures 6, 7:
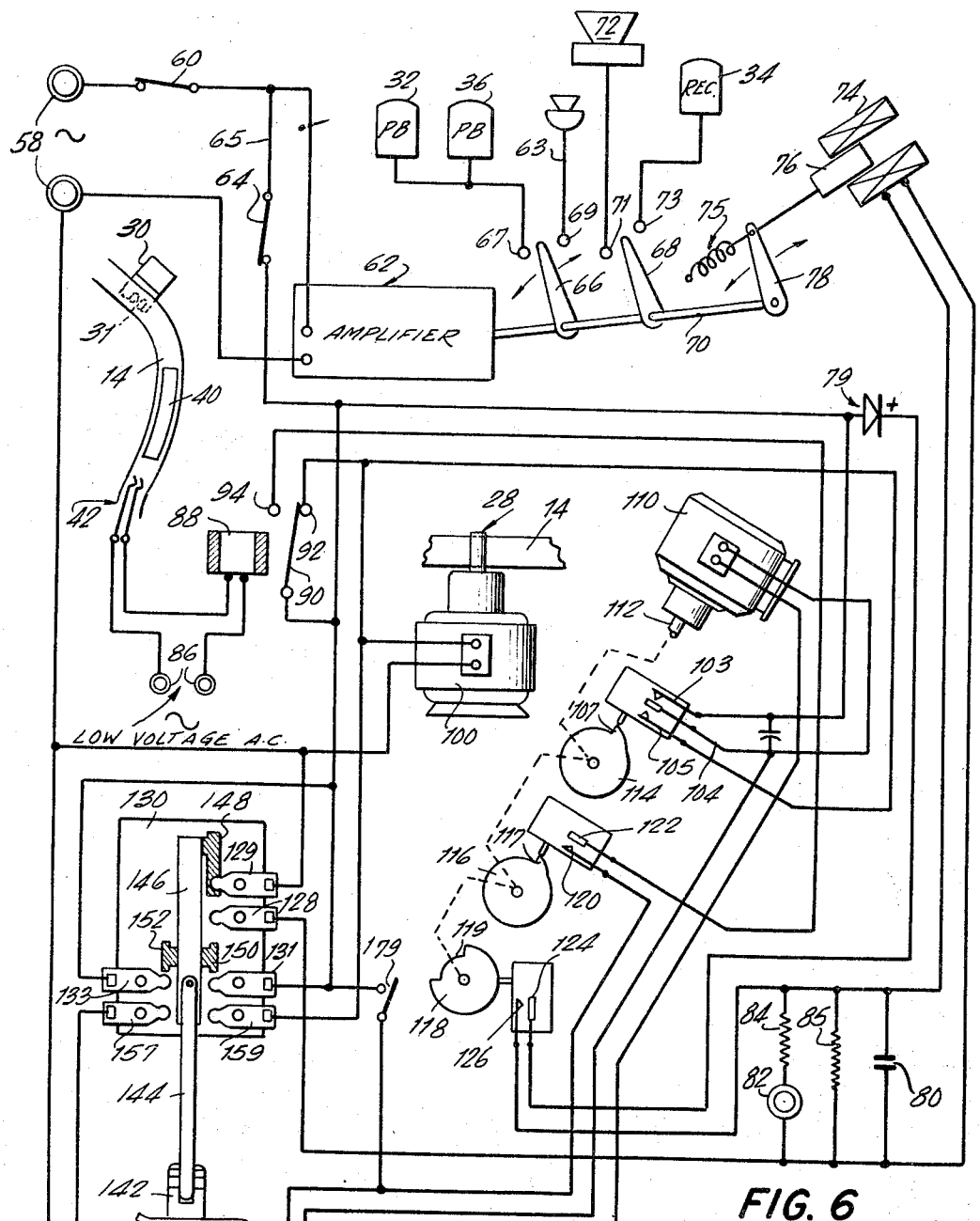
FIG. 6 is a schematic view and circuit diagram of the device of FIG. 1, with the cams and related parts shown in perspective view.
FIG. 7 is a composite elevation view of the cams of FIG. 6, illustrating the quadrants or portions of the timing cycle.

Cam lobe 117 on the periphery of cam 116, together with normally open microswitch contacts 120, 122 associated therewith, determine the mutually aligned exact starting location 121, shown in FIGURE 7, of each complete four-sequence cycle. The recessed cam portion 119 of cam 118, acting together with normally open microswitch contacts 124, 126, serves to energize the solenoid 74, the neon light 82 and contact 128 of a multiple-contact switch 130 described in detail below.

The timing action of the cams 114, 116 and 118 is schematically illustrated in FIG. 7. Cam lobe 117 of cam 116 describes a complete cycle as it rotates through the four quadrants 132, 134, 136 and 138 to return to its starting point 121. Each of the three cams 114, 116, 118 rotate together with their common cam shaft 112. It takes four seconds for the point 121 to pass through each of the quadrants 132, 134, 136, 138, returning to its original starting point 121 of FIG. 7 in a total of sixteen seconds. The first teacher's voice playback time span of four seconds is indicated by the quarter cycle 132. The student's recording cycle is indicated by the quarter cycle 134. The second teacher's voice playback is indicated by the quarter cycle 136, and the last quarter cycle 138 is the playback of the pupil's rendition.

The multiple contact switch 130 is controlled by an alternating current solenoid 140, which is provided with a solenoid plunger 142 and rod 144 linked to a slide 146. The plunger 142 is loaded by a spring (not shown) to normally keep it out of the solenoid. The contact switch 130 carries stationary contacts 128 and 129; 131 and 159; and 133 and 157.

The connecting rod 144 of the solenoid 140 activates the multiple switch 130 which is provided with a hook and spring latching mechanism, known per se (not shown). The switch latching mechanism serves to retain the slide 146 in up or down position upon instantaneous sequential pushing downwardly of the rod 144, in the present case by means of the solenoid 140. A spring (not shown) urges the rod 144 upwardly as viewed in FIG. 6. The slide 146 attached to rod 144 has attached thereto three slide contacts 148, 150, and 152, the contact 148 being at least twice the length of the contact 150 and 152 in the direction of movement of the rod 144. Since a short and instantaneous connection is needed by contacts 150 and 152, these latter moving or sliding contacts are shortened at their lower contact side, as viewed in FIG. 6. Sliding contact 148 closes the circuit between 128 and 129; sliding contact 150 closes the circuit between 131 and 159; and sliding contact 152 closes the circuit between 133 and 157. When the slider contact 148 is latched in position it connects contacts 128 and 129. The slider contact 150 will make only a short duration contact between the contacts 131 and 159, and likewise contact 152 will make only a similar short contact between the contact members 133 and 157.

At the end of each phase of this cycle there will be an open circuit between 131 and 159, and between 133 and 157, as shown in FIG. 6. Thus, for this sequence, contact 148 now makes a permanent contact between stationary contact members 128 and 129, and moving contacts 150 and 152 have had only instantaneous contacts with respective switch members 131 with 159 and 133 with 157. Circuit connection between 128 and 129 will be either on or off alternately in sequence each time the solenoid 140 is activated.

The function of multiple switch 130 and solenoid 140 will now be described. The magnetic plug 142 with its connection rod 144 acts upon the slider base of the locking or latching triple switch 130. The drill sequence must have a perfectly synchronized starting point at the different quadrants of the cycle of FIG. 7, and therefore the timing motor 110 will run until the lobe 117 of cam 116 and the lobe 107 of cam 114 together reach mutually aligned starting point 121 (FIG. 7).

The device will now be described in relation to FIG. 6 in connection with the wiring circuit. The device is capable of performing two different sequences of operation, namely playback sequence and drill sequence, automatically controlled. When the lesson starts, the machine is in playback sequence, and the voice or rendition of the teacher as recorded on the tape will give a preliminary instruction or lecture to explain the lesson pedagogically. For this purpose a regular playback of the teacher's rendition recorded on the upper half track of the tape occurs through playback head 32 with its pole pieces 33 located on the upper track only (FIG. 1). This track cannot be erased accidentally, because the pole pieces 31 of the erasing head 30 are located only on the lower track and no erasing or recording head of the machine comes in contact with the upper track.

When the lesson starts, even before the recorded teacher's lecture is heard, the general main switch 60, shown in FIGURE 6, is switched on to activate the amplifier and the tape-breakage switch 64 is in closed position. Current passing through the contact arm 90 of the relay 88, normally closed to contact 92, causes the tape drive motor 100 to rotate, pulling the tape 14 through the capstan 28. Current is supplied to one pole of the motor directly from the source 58 and to the other pole through normally closed contact 92. The synchronous motor 110 is fed to one pole thereof through the tape breaking switch 64 and through normally closed contacts 103, 104 associated with the cam 114. The other pole of motor 110 is connected directly to the current source 58. Thus, the tape 14 is moved by means of motor 100, the amplifier 62 is energized, and the motor 110 with its camshaft 112 is turning at the rate of one revolution every sixteen seconds. It is understood that during the playback mode of operation the neon light 82 will not be lighted, because the moving contact 148 of switch 130 will not be connected across the contacts 128 and 129, which connects the power source 58 across the neon light 82 and the solenoid 74. If, when the lesson starts it is found that the automated teaching apparatus is in playback sequence, the circuit to actuate motors 100 and 110 will be as follows: 58–60–65–64–90–92–100–58, actuating the tape drive motor 100 and 58–60–65–64–103–104–110–58, actuating the timing or cycling motor 110. Regarding cam 114, the circuit to motor 110 will be: 58–60–65–64–103–104–110–58 for the part of the cam 114 other than lobe 107 pushes its microswitch plunger, the circuit to motor 110 wil become: 58–60–65–64–90–92–105–104–110–58. This will result in an uninterrupted current to the timing motor 110, even when all the microswitch plungers are up or down. All this, of course, takes place when the gate circuit is open and at rest. But when, at the end of the playback cycle, the conductive foil 40 is in the gate and shorts circuit contacts 42, then solenoid 88 will cause contact arm 90 to make contact with 94, thus opening circuit 90–92 and stopping the drive motor 100.

The timing motor circuit remains 58–60–65–64–103–104–110–58 until the lobe 107 of cam 114 pushes its microswitch plunger and opens the circuit. This momentarily stops the timing motor 110 at the exact start of cycle point 121 of FIG. 7 (lobes 107 and 117). This is now the point of exact start for the following drill sequence to take place. A split second later the following happens: with foil 40 still across the gate circuit contacts 42, the circuit is 58–60–65–64–90–94–122, now becomes connected to 120–140–58 by action of lobe 117 of cam 116 on its microswitch plunger. This circuit now will actuate the solenoid 140 which, through slider ensemble 146, will latch the contact 148 for the duration of this drill sequence across the pair of contacts 128 and 129. This latter action forms a circuit 58–129–148–128–74–126, which wil stay temporarily open until the depression 119 of cam 118 presents itself at the plunger of its microswitch; then from 126 to 124–79–64–65–60 and 58. In other words, this will make direct current available from rectifier 79 for operating solenoid 74 when the ninety-degree depression 119 of cam 118 will have established contact between microswitch contacts 124 and 126 at the right instant to start the recording of the pupil's rendition. The actuation of solenoid 140 will also make a short duration contact between contacts 131 and 159 by sliding contact 150, which will give the initial start to the drive motor 100, just enough to make the foil 40 on tape 14 leave the gate, and in doing so restore contact 90 to 92. Simultaneously, slider 152 will make a short duration contact between stationary contacts 133 and 157, thus starting the timing motor 110 until the lobe 107 of cam 114 has passed the plunger of its microswitch and thus restored contact between 103 and 104. The slider contacts 152 and 150 of multiple switch 130 make only momentary contact during this operation of multiple switch 130. During this drill sequence the only active cam will be cam 118, whose depression 119, by operating its microswitch 124–126, will operate the switching-over by solenoid 74 of the amplifier 62 for four seconds from play back mode to recording mode. The entire drill sequence, previously explained, now takes place.

When, at the end of this drill sequence, a conductive foil 40 on tape 14 is in the gate, the following operations will take place to cause the change over from direct sequence to playback sequence. The gate circuit will actuate relay 88 to open the circuit between 92 and 90 and thus stop the tape drive motor 100. Actuation of relay 88 causes a new circuit to form, namely: 58–60–65–64–90–94–122. However, an open circuit will exist here until the lobe 117 of cam 116 pushes the plunger of its microswitch down to make contact with contact 120. Then the circuit will be completed through 120–140–58. This circuit will activate the solenoid 140 and its plunger 142 of the triple latching switch 130 with slide 146. This point in the cycle will also mark the exact starting point for the playback sequence. Slide contact 148 will now have moved away from stationary contact 128 and be latched into position in contact with 129 for the duration of this entire sequence. Slider 150 will connect 131 to 159 for a short duration and so give an initial first start to the drive motor 100, as explained above. Similarly, 152 will briefly bridge contacts 133 and 157, which will give the initial start to the timing motor 110 in the same manner.

All of the above actions described relative to multiple latching switch 130 take place in a split second, and thus one of the great advantages of my present invention is the synchronized stopping and starting of the tape drive motor 100 and the timing motor 110. This allows the lesson to proceed with the various playbacks and the recording of the student's voice without any possible mistake, interruption or intervention.

The playback sequence will continue until a new drill sequence is desired, actuated by another conductive foil on tape 14 closing the gate circuit contacts 42. Thus, the automated teaching apparatus is in readiness for changeover from drill sequence to ordinary playback repeatedly, as was planned when making the lesson tape.

All taped lessons start with the playback sequence of the teacher's introduction because it is then that the teacher's voice explains the lesson pedagogically. For this purpose a regular playback of the teacher's instruction is permanently recorded on the upper half-track of the tape, and is reproduced through playback head 32 with its pole pieces 33 located on the upper half-track only (FIG. 1). This track cannot be erased accidentaly because no erasing or recording head is in contact with the upper half-track. If, during previous use the apparatus has been stopped for some reason during a drill sequence and rewound, then a manual push button 179 will operate the changeover of sequence.

It will be understood, of course, that other gate switches may be used in lieu of the foil 40 and gate switch 42. For example, a thick patch at the appropriate location on the tape, or perforations made along the centerline of tape 14 can serve to close contacts appropriately arranged. Alternatively, a superposed signal of inaudible frequency, recorded on the teacher's track, can be used to close the gate switch.

To further facilitate the threading of the tape when starting a new lesson there is graphically represented another arrangement in FIG. 8.

In the device of FIG. 8 a roller 180 is mounted on a movable carrier 183, which can ride or move transversely to the tape travel path along a rail 182 to the position 181. When threading the tape this carrier 183 and its roller will be at the location 180. After the tape is threaded along a longitudinal path the carrier 183 and roller 180 will be moved transversely, either mechanically or manually, along the rail 182 to the position 181. Thus there is formed an open loop of tape around rollers 184, 181 and 185, having a fixed distance between heads 34 and 36 (measured along the tape) of twice the distance (along the tape) between heads 32 and 34, as required.

It will be obvious to those skilled in the art, upon studying this disclosure, that devices according to my invention can be modified in various respects and hence may be embodied in apparatus other than as particularly illustrated and described herein, without departing from the essential features of my invention and within the scope of the claims annexed hereto.

I claim:

1. An automated teaching apparatus comprising receiving means for receiving a recorded medium, said medium carrying thereon a plurality of parallel magnetically recorded channels wherein a first channel carries prerecorded instructional sounds in a first rendition followed by a repeated rendition of a plurality of drill sequences in correlated time intervals, and wherein a second channel carries a magnetic recording of a pupil's rendition of said drill sequences, said receiving means including guide means defining a travel path for said medium with portions for said first and second channels thereof; a plurality of transducers, disposed adjacent said travel path at predetermined spaced intervals, said transducers having pole pieces being respectively aligned with predetermined ones of said first and second channels, reproducing circuit means for said transducers correlated with said first and second channels, a recording circuit for said second channel, a source of electrical power, amplifier means, timing means and switching means connected to said source of power for selectively connecting said amplifier means to said reproducing circuit means and to said recording circuit under control of said timing means, said plurality of transducers including a first and second and third transducer, said first transducer being connected in said reproducing circuit means for reproducing said instructional sounds recorded on said first channel and for making same audible to a student, said recording circuit including means for generating signals representing the response of the student to said instructional sounds, said second transducer being connected in said recording circuit for recording said signals on said second channel, said third transducer being connected in said reproducing circuit means for reproducing the response of the student recorded on the second channel and making same audible to the student, said amplifier means having an input and an output, said switching means including a gate circuit and a gate switch associated with the recorded medium for controlling said gate circuit, and a drive motor for moving the recorded medium along said travel path relative to said transducers, said gate switch including lengths of electrically conductive foil movable along said travel path with the recorded medium for closing said gate circuit, said switching means further including first solenoid means associated with said amplifier means for selectively connecting in one first solenoid position and reproducing circuit means to said amplifier means output to automatically switch said apparatus from a playback sequence to reproduce the pre-recorded instructional sounds on the first of said channels and in another of the first solenoid positions to selectively connect said amplifier input with said recording circuit, said timing means including control means to alternate said first solenoid between said one and other positions thereof during the drill sequences, said timing means including a constant speed motor having a shaft, a plurality of cams fixed to said shaft, and cam switches associated with respective ones of said cams for actuation thereby.

2. Apparatus according to claim 1, including erasing head means having pole pieces positioned along the second of said channel portions of said path so as to erase only the recorded student's response.

3. Apparatus according to claim 1, wherein said cams are rotatable together to define mutually aligned starting points, said cam switches include a multiple contact switch having a plurality of movable contacts and pairs of stationary contacts, said multiple switch being provided with a second solenoid for controlling movement of said movable contacts, said multiple contact switch being further provided with a latching mechanism to retain said movable contacts in a selected position upon actuation of said multiple switch by said second solenoid.

4. Apparatus according to claim 3, said timing motor having a timing motor circuit connecting said timing motor to said source of power, a first of said cam switches having a plunger actuatable by a first one of said cams to energize said timing motor independent of the position of said multiple switch moving contacts.

5. Apparatus according to claim 3, said second solenoid being operatively connected to said gate switch to disconnect said drive motor when said gate circuit is closed, said first cam switch having a plurality of contacts, one of said latter contacts being connected to said timing motor circuit to energize said timing motor from said current source until said first cam reaches a predetermined point on its periphery, another of said contacts of said first cam switch being actuatable by said first cam to connect said timing motor to said source of power while said switch actuating solenoid is de-energized, said gate circuit switch comprising a pair of gate contacts in said gate circuit, said conductive foil being attached to the recording medium for closing said gate circuit contacts to initiate the drill sequence mode of operation.

6. Apparatus according to claim 1, wherein said cams are rotatable together to define mutually aligned starting points, said cam switches include a multiple contact switch having a plurality of movable contacts and pairs of stationary contacts, said multiple switch being provided with a second solenoid for controlling movement of said movable contacts, said multiple contact switch being further provided with a latching mechanism to retain said movable contacts in a selected position upon actuation of said multiple switch by said second solenoid, said second solenoid being operatively connected to said gate switch to disconnect said drive motor when said gate circuit is closed, said first cam switch having a plurality of contacts, one of said latter contacts being connected to said timing motor circuit to energize said timing motor from said current source until said first cam reaches a predetermined point on its periphery, another of said contacts of said first cam switch being actuatable by said first cam to connect said timing motor to said source of power while said switch actuating solenoid is de-energized, said gate circuit switch comprising a pair of gate contacts in said gate circuit, said conductive foil being attached to the recording medium for closing said gate circuit contacts to initiate the drill sequence mode of operation, a second of said cam switches being actuatable by a second of said cams to energize said second solenoid for operating said multiple switch, a first movable contact of said multiple switch being engageable with a first pair of said stationary contacts for the duration of said drill sequence mode of operation until a third of said cams actuates a third of said cam switches to close the latter, said direct current means including rectifier means for supplying direct current to said first solenoid, a third of said cam switches being connected to said first solenoid and actuatable by a third of said cams to connect said rectifier means to said solenoid to actuate the latter for energizing said second transducer to record on said second channel, the second of said movable contacts of said multiple switch being engageable with a second pair of said stationary contacts to energize said drive motor.

References Cited

UNITED STATES PATENTS

| | | | |
|---|---|---|---|
| 2,892,040 | 6/1959 | Johnson et al. | 35—35.3 X |
| 2,908,771 | 10/1959 | Gallina. | |
| 3,118,235 | 1/1964 | Ley | 35—35.3 |
| 3,155,778 | 11/1964 | Meyer | 35—35.3 X |
| 3,263,936 | 8/1966 | Williams | 242—55.13 |

WILLIAM H. GRIEB, *Primary Examiner.*

U.S. Cl. X.R.

179—100.2